L. C. TUNSTEAD.
GARDEN SHEARS.
APPLICATION FILED MAR. 31, 1914.
1,101,890.
Patented June 30, 1914.
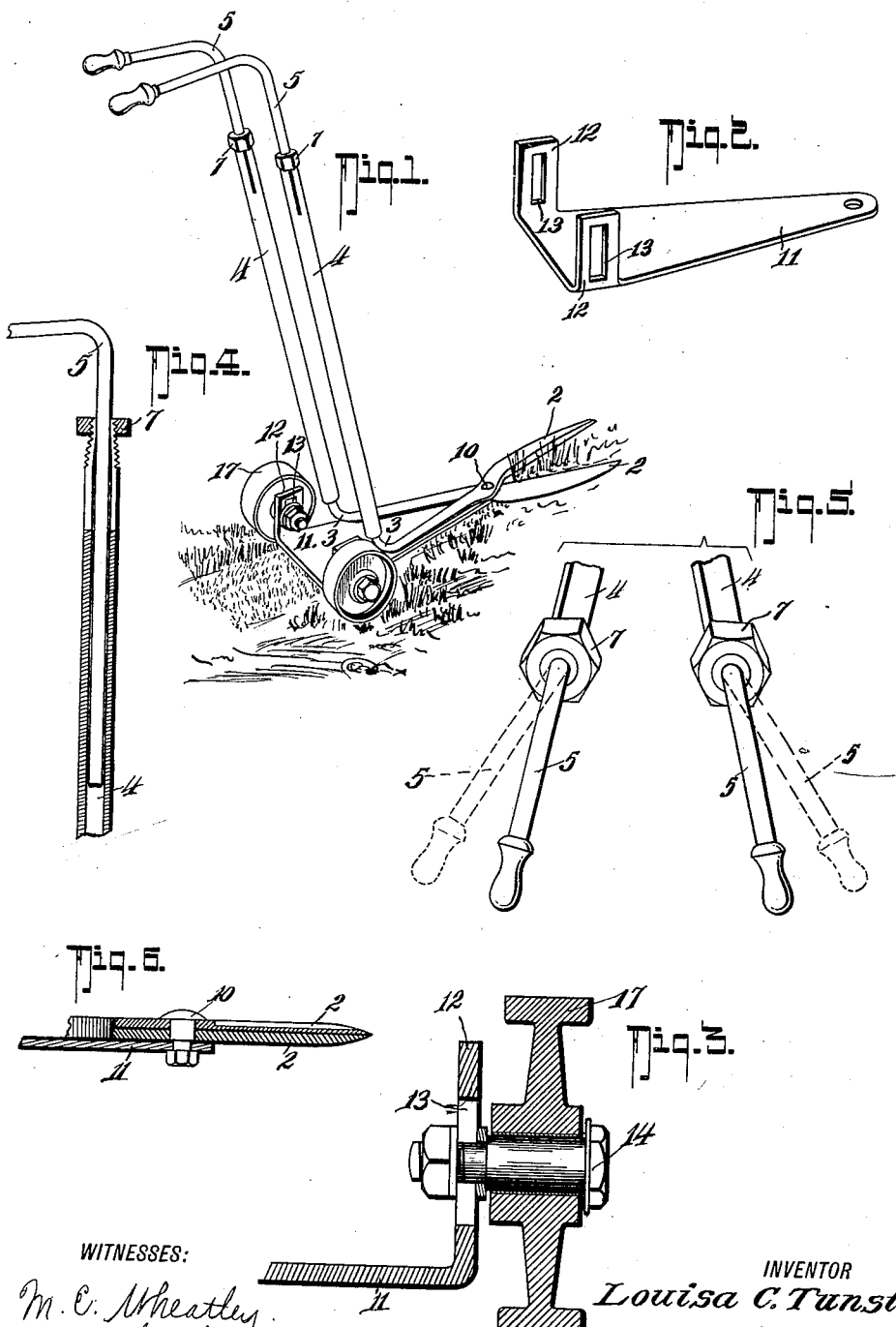
WITNESSES:
M. E. Wheatley
E. P. Wheatley
INVENTOR
Louisa C. Tunstead
BY
ATTORNEYS

UNITED STATES PATENT OFFICE.

LOUISA CATHERINE TUNSTEAD, OF VICTORIA, BRITISH COLUMBIA, CANADA.

GARDEN-SHEARS.

1,101,890.

Specification of Letters Patent. Patented June 30, 1914.

Application filed March 31, 1914. Serial No. 828,473.

*To all whom it may concern:*

Be it known that I, LOUISA CATHERINE TUNSTEAD, of the city of Victoria, in the Province of British Columbia, Canada, have invented certain new and useful Improvements in Garden-Shears, of which the following is a specification.

This invention relates to an improvement in grass cutting garden shears, having lengthened, upturned and adjustable handles the shears being mounted on a light frame which is provided with wheels and adjustable thereon in its height from the ground.

The object of the invention is to provide shears of this class which are more conveniently applicable for cutting grass around the edges and borders of plots which are inaccessible to an ordinary lawn mower.

The invention is particularly described in the following specification, reference being made to the accompanying drawings, in which:—

Figure 1 is a perspective view of the shears complete. Fig. 2 is a perspective view to an enlarged scale of the carrying frame. Fig. 3 is an enlarged sectional detail of the manner of attaching the wheels to the said carrying frame so as to render it adjustable as to its height from the ground, and Fig. 4 is an enlarged detail in section showing the manner of adjustably securing the handles in the lengthening tubes. Fig. 5 is a diagrammatic plan view that illustrates the adjustability of the handle 5. Fig. 6 is a detail longitudinal section of the shear blades and their pivotal connection with the frame member 11.

In these drawings, 2 represents the shear blades, the handle ends, 3 of which are upwardly turned and are brazed or otherwise suitably secured in the lower end of tubular extension members, 4. Within the upper ends of these tubular members 4 bent handle rods, 5 are telescopically slidable, so as to be adjustable in length to the requirements of the user. The rods, 5 may be secured in any position of adjustment by any suitable means. In Fig. 4 of the drawing they are shown as each slidably passing through a split conical sleeve, 6, the taper of the outer side of the cone fitting in the end of the tube, 4 and tightened therein by a nut, 7 threaded on the outside of the tube and internally shouldered to engage the upper end of the conical sleeve and press it into the end of the tube, 4, thereby closing the sleeve, to grip the rod. The shears, 2 are mounted on a substantially triangular plate frame, 11, the pivot pin 10 of the shears being shouldered where it passes through the plate and provided with a nut on the underside. By this means the pivot may be securely held in the plate while the shear blades are allowed freedom of movement on the pin. Lugs 12, are upturned from each side at the back end of the plate frame, 11 for the connection thereto of the wheels, 17 on which it is supported at any desired height from the ground. Each lug, 12, is provided with a vertically elongated aperture 13, for the squared or flattened neck, 15, of the axle bolt, 14, and these bolts are secured at any desired position of vertical adjustment in the elongated aperture, 13, by nuts on the outer ends of the bolts, which nuts tighten against a tubular sleeve, 16, fitting on the bolt and bearing against the lug, 12.

The sleeve, 16 is slightly longer than the hub of the wheel, 17, so that the axle bolt may be securely tightened in the lug of the frame, 11, without interfering with the free rotation of the wheel on the sleeve.

By this construction an exceedingly simple and effective garden shears of this class are provided, the same being adjustable in the cutting height of the shears from the ground and in the upwardly turned length of the handles to suit the user. Its operative parts are free from any complication liable to clog and interfere with the free action of the shears, and they are light and convenient to operate. I am aware that various attempts have previously been made to produce grass cutting shears of this class, but the same have been complicated in design and wanting in the facility for adjustment here afforded.

What I claim is:—

1. Grass cutting shears comprising the combination with a pair of shears having upwardly turned extended handles, of means for adjustably supporting the shears from the ground, said means comprising a substantially triangular plate frame to the forward end of which the pivot of the shears is secured, and the other end of which has upwardly turned lugs, with vertically elongated apertures, an axle pin adjustably secured in the elongated aperture of each lug, and a wheel mounted on each pin.

2. Grass cutting shears comprising the combination with a pair of shears, the handle ends of which are upwardly turned and elongated, a substantially triangular plate frame, in the forward end of which the pivot of the shears is secured, the after end of said frame having lateral projections, which are upwardly turned at right angles to the plate and have vertically elongated apertures, an axle bolt having a square neck to fit the width of each aperture of each upwardly turned projection, a tubular sleeve fitting on each bolt, and a wheel rotatably mounted on each sleeve, the length of the boss of said wheel being less than the length of the sleeve, and means for tightening the sleeve against the upwardly turned projection.

3. Grass cutting shears comprising the combination with a pair of shears the handle ends of which are upwardly turned and have tubular extensions secured to them, angularly bent handle rods telescopically slidable within the tubular extensions, a conical split sleeve slidably fitting on each rod, a nut threaded on the outside of the tube and having an inwardly projecting shoulder to engage the end of the conical sleeve, a substantially triangular plate frame in the forward end of which the pivot of the shears is secured, the after end of the frame having lateral projections which are upwardly turned at right angles to the plate, each upwardly turned projection having a vertically elongated aperture, an axle bolt adjustably secured in each aperture and a wheel rotatable on each axle bolt.

LOUISA CATHERINE TUNSTEAD.

Witnesses:
E. E. WOOTTON,
H. N. WOOTTON,
A. W. CAMERON.

---

Copies of this patent may be obtained for five cents each, by addressing the "Commissioner of Patents, Washington, D. C."